(12) United States Patent
Liu et al.

(10) Patent No.: US 9,350,135 B2
(45) Date of Patent: May 24, 2016

(54) FLOW GUIDE DEVICE FOR DUAL-ELECTRODE DISCHARGE CAVITY, DUAL ELECTRODE DISCHARGE CAVITY UTILIZE THE SAME AND EXCIMER LASER

(71) Applicant: ACADEMY OF OPTO-ELECTRONICS, CHINESE ACADEMY OF SCIENCES, Beijing (CN)

(72) Inventors: Bin Liu, Beijing (CN); Jinbin Ding, Beijing (CN); Kuibo Wang, Beijing (CN); Yu Wang, Beijing (CN); Yi Zhou, Beijing (CN); Jiangshan Zhao, Beijing (CN)

(73) Assignee: ACADEMY OF OPTO-ELECTRONICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 14/646,176

(22) PCT Filed: Feb. 7, 2013

(86) PCT No.: PCT/CN2013/071507
§ 371 (c)(1),
(2) Date: May 20, 2015

(87) PCT Pub. No.: WO2014/079174
PCT Pub. Date: May 30, 2014

(65) Prior Publication Data
US 2015/0333468 A1    Nov. 19, 2015

(30) Foreign Application Priority Data

Nov. 21, 2012 (CN) .......................... 2012 1 0476797

(51) Int. Cl.
| | |
|---|---|
| H01S 3/22 | (2006.01) |
| H01S 3/036 | (2006.01) |
| H01S 3/225 | (2006.01) |
| H01S 3/038 | (2006.01) |
| H01S 3/097 | (2006.01) |

(52) U.S. Cl.
CPC .................. *H01S 3/036* (2013.01); *H01S 3/038* (2013.01); *H01S 3/097* (2013.01); *H01S 3/225* (2013.01)

(58) Field of Classification Search
CPC .......... H01S 3/036; H01S 3/038; H01S 3/225
See application file for complete search history.

(56) References Cited

U.S. PATENT DOCUMENTS

| | | |
|---|---|---|
| 2005/0058172 A1 | 3/2005 | Paetzel et al. |
| 2008/0198891 A1 | 8/2008 | Hori et al. |
| 2008/0310960 A1 | 12/2008 | Amada et al. |

FOREIGN PATENT DOCUMENTS

| | | | |
|---|---|---|---|
| CN | 202307771 | 7/2012 | |
| CN | 102810810 | 12/2012 | |
| JP | 60118261 A * | 6/1985 | ............ H01S 3/036 |
| JP | 08125253 A * | 5/1996 | ............ H01S 3/036 |

OTHER PUBLICATIONS

International Search Report for international application No. PCT/CN2013/071507, dated Aug. 15, 2013 (6 pages, including English translation).

* cited by examiner

*Primary Examiner* — Yuanda Zhang
(74) *Attorney, Agent, or Firm* — Hamre, Schumann, Mueller & Larson, P.C.

(57) ABSTRACT

The present disclosure proposes a flow guide device for a discharge cavity having a symmetrical configuration and including two pairs of electrodes; the flow guide device comprises two rotors which correspond to one pair of the two pairs of electrodes, respectively, installed positions of which are symmetrical about a symmetrical plane of the discharge cavity and is beneath the electrodes, a rotational axis of which is parallel to an axial direction of the electrodes which is parallel to a base plane of the discharge cavity, and the two rotors have opposite rotation directions and identical rotation speeds. The flow guide device further comprises a spoiler plate and a flow guide plate so that the discharge gas flow passes through the discharge cavity in a manner of high speed and uniform cycling when flowing through the discharge region. Thus, the discharge quality is guaranteed so as to improve the energy and reliability of the laser.

7 Claims, 5 Drawing Sheets

FLOW GUIDE DEVICE FOR DUAL-ELECTRODE DISCHARGE CAVITY, DUAL ELECTRODE DISCHARGE CAVITY UTILIZE THE SAME AND EXCIMER LASER

TECHNICAL FIELD

The present disclosure belongs to the laser field, and particularly, to a flow guide device of a discharge cavity for an excimer laser with a single-cavity dual-electrode discharge cavity for photolithography, a dual-electrode discharge cavity utilizing such a flow guide device and an excimer laser.

BACKGROUND

At present, the excimer lasers are considered to be best candidates for light sources for photolithography, and are predominant working light sources in the Integrated Circuit (IC) photolithography industry.

The current excimer lasers have been developed from an original single cavity structure to a dual cavity structure so as to implement a narrower line width and a higher average output power. Those excimer lasers with a dual cavity structure are constituted of two discharge cavities, the configurations of which are substantial identical to each other and are referred to as a seed cavity and an amplifier cavity, respectively. A basic working process is shown as follows: the seed cavity generates a seed light with a narrow line width and a lower energy at a certain repetition rate; the seed light is implanted into the amplifier cavity to be amplified; and a perfect excimer laser with a narrow line width and a high power is output eventually.

A conventional dual-cavity excimer laser is shown in FIG. 1, which is constituted of two discharge cavities 101 and 102, i.e. the seed cavity 101 and the amplifier cavity 102. The two discharge cavities have a pair of discharge electrodes 103 and 104, respectively. There is a module 105 for narrowing the line width at a reflecting end of the seed cavity. The seed cavity 101 and the amplifier cavity 102 are connected by modules 106, 107 and 108 and the functions of these modules comprise control, adjustment and measurement of light path. Such a dual-cavity excimer laser needs to provide the two discharge cavities with a set of high voltage power supplies 109 and 110, respectively.

Some researchers propose an excimer laser with a single-cavity dual-electrode configuration, in which two pairs of discharge electrodes are installed in parallel in one discharge cavity; one pair of the electrodes is configured to generate a seed light and the other pair of the electrodes is configured to amplify the seed light. The advantage of such a technical solution is to facilitate a synchronously control of the discharge and to decrease the complexity of the excimer laser.

A conventional dual-electrode discharge cavity is shown in FIG. 2. Two pairs of electrodes 202 and 203 are installed in parallel in a discharge cavity 201. The two pairs of electrodes only utilize one set of high voltage power supply 204 to discharge. Thus, the complexity of the excimer layer is decreased and the integration of the whole machine is facilitated.

However, it should be noted that when the excimer laser is operated at a high repetition rate, it needs to form a high speed gas flow between the discharge electrodes so as to carry away exhaust gas which has been discharged and to continuously supply fresh working gas for discharge, which guarantees discharge quality and improves energy and reliability of the laser. When the two pairs of electrodes are installed in parallel in the discharge cavity, a gas flow with approximately the same flow velocity and uniformity needs to be generated between the two respective electrodes. Thus, it is desired to design a novel discharge cavity to establish a new means for cycling the gas.

SUMMARY

1. Technical Problems to be Solved

The technical problem to be solved by the present disclosure is to provide a series of flow guide device for a dual-electrode discharge cavity of an excimer laser, so that the discharge cavity establishes a symmetrical flow field distribution in the cavity, and simultaneously forms a high speed gas flow with consistent flow velocity and uniformity in both different discharge regions.

2. Technical Solutions

In order to solve the technical problems as mentioned above, the present disclosure proposes a flow guide device for a discharge cavity having a symmetrical configuration and including two pairs of electrodes; the flow guide device comprises two rotors which correspond to one pair of the two pairs of electrodes, respectively; installed positions of the rotors are symmetrical about a symmetrical plane of the discharge cavity and are beneath the electrodes; a rotational axis of the rotors are parallel to an axial direction of the electrodes which is parallel to a base plane of the discharge cavity; and the two rotors have opposite rotation directions and identical rotation speeds.

According to one preferable embodiment of the present disclosure, a lower spoiler plate is installed beneath each of the rotors and is configured to prevent the gas flow from passing beneath the rotors.

According to one preferable embodiment of the present disclosure, the lower spoiler plate has a declined surface or a cambered surface. That is to say, a windward side of the spoiler plate is designed to be a declined surface or a cambered surface. The cambered surface may be an inwardly recessed cambered surface, an outwardly raised cambered surface, or a combination thereof.

According to one preferable embodiment of the present disclosure, an upper spoiler plate extends from the installed position beneath each pair of the electrodes to a corresponding rotor.

According to one preferable embodiment of the present disclosure, a flow guide plate is installed on sidewalls of the rotors and configured to guide a gas flow at an exit of the rotors to the discharge region of the electrodes.

According to one preferable embodiment of the present disclosure, an upper flow guide plate is installed between an end of the flow guide plate and an upside of the electrode, and the upper flow guide plate and the upper spoiler plate constitute a gradually tapered interval channel.

According to one preferable embodiment of the present disclosure, a symmetrical confluent flow guide plate is installed at a middle position within the discharge region of the two electrodes and is configured to converge a gas flow passing through the discharge region into a downwards gas flow.

According to one preferable embodiment of the present disclosure, a lower flow guide plate is protruded from a downwards direction of each electrodes to the corresponding rotors, which presents an arc shape bending towards to the rotors.

The present disclosure further propose a dual-electrode discharge cavity including the flow guide as mentioned above and an excimer laser including the dual-electrode discharge cavity.

3. Advantageous Effect

The present disclosure utilizes two rotors for passing flow as a drive source of gas flow in the whole cavity. The two rotors are rotated in opposite directions. A series of flow guide arrangements are provided around the rotors in the cavity to form an interval channel which is in favor of forming of the gas flow and acceleration of the gas flow. Finally, a uniform gas flow at a high speed is achieved in the discharge region. The two rotors and the flow guide device are both installed symmetrically and the rotation speed of the rotors are kept to be consistent, so that a result flow field within the cavity is approximately symmetrically distributed.

The present disclosure may synchronously obtain uniform gas flows at a high speed within both discharge regions in the dual-electrode discharge cavity to guarantee the discharge quality so as to improve the energy and reliability of the laser.

DETAILED DESCRIPTION

In order to clarity objects, solutions and advantages of the present disclosure, the present disclosure would be further in detail illustrated from the following detailed descriptions of specific embodiments thereof with reference to attached drawings.

Figure 1:
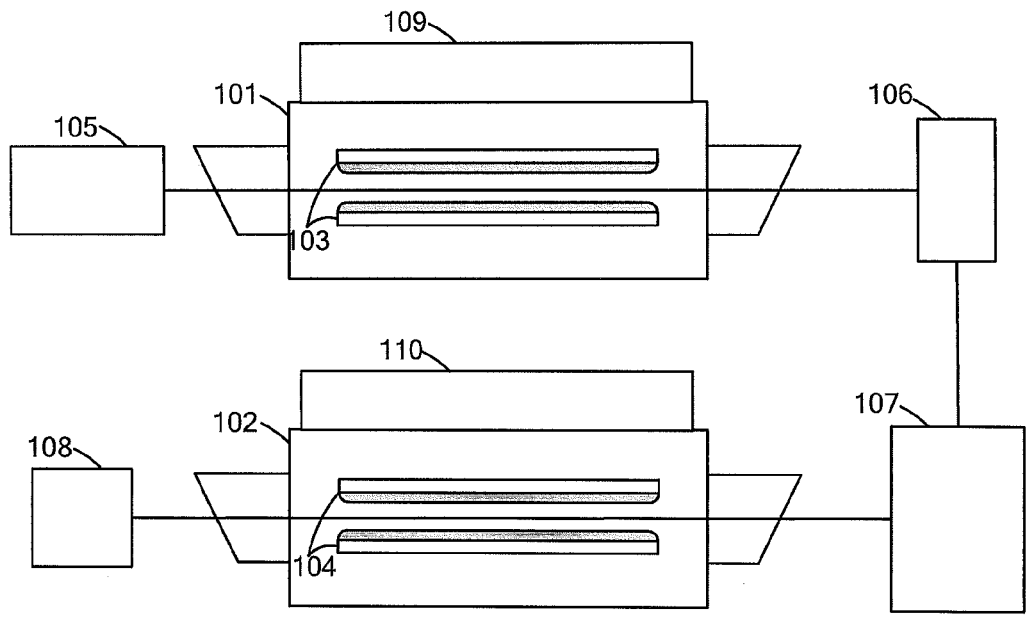
FIG. 1 shows a schematic view of a dual-cavity excimer laser according to the related art.
Figure 2:
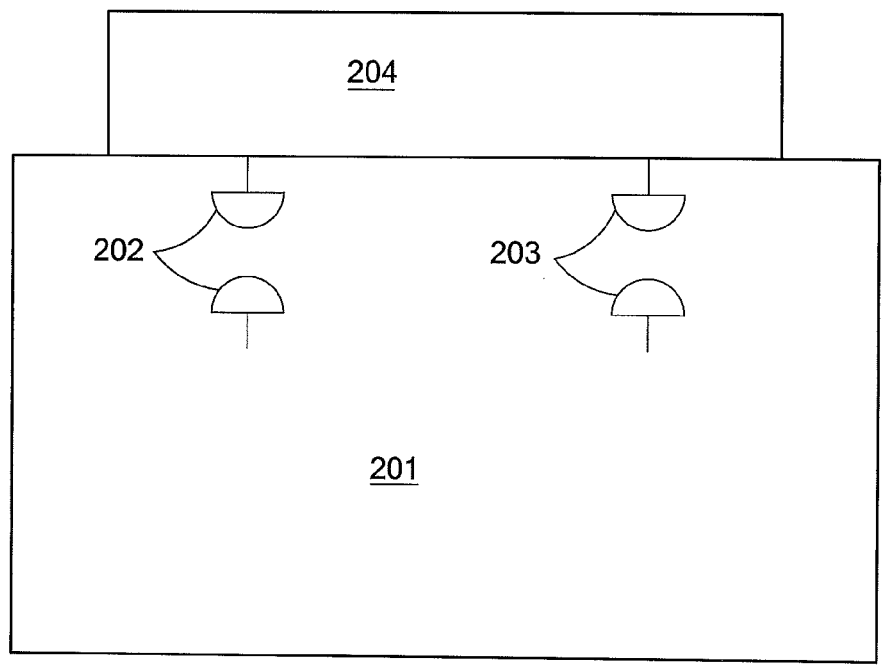
FIG. 2 shows a schematic view of a dual-electrode discharge cavity according to the related art.
Figure 3:
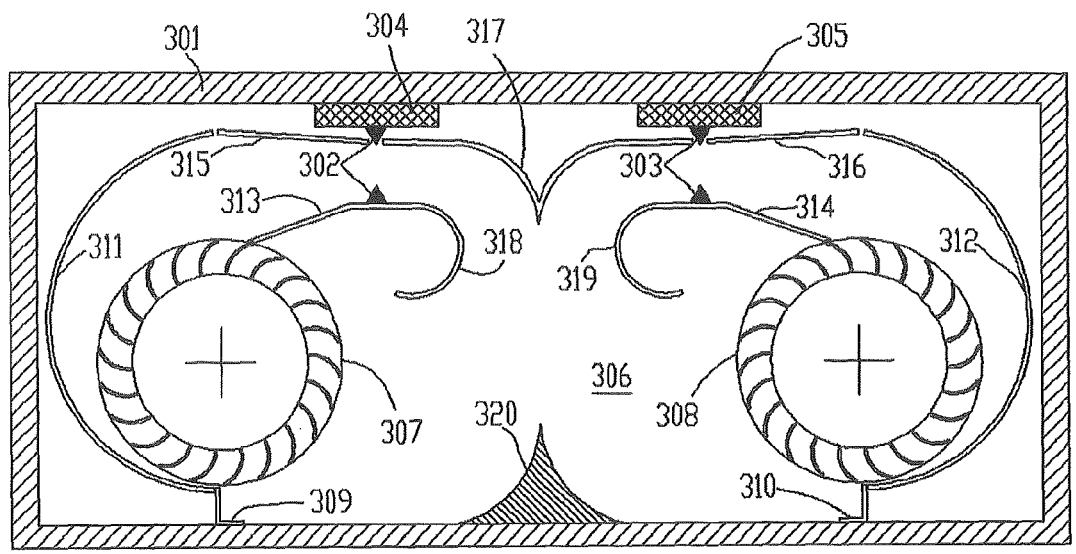
FIG. 3 shows a schematic cross sectional view of a dual-electrode discharge cavity for an excimer laser according to an embodiment of the present disclosure.
Figure 8:
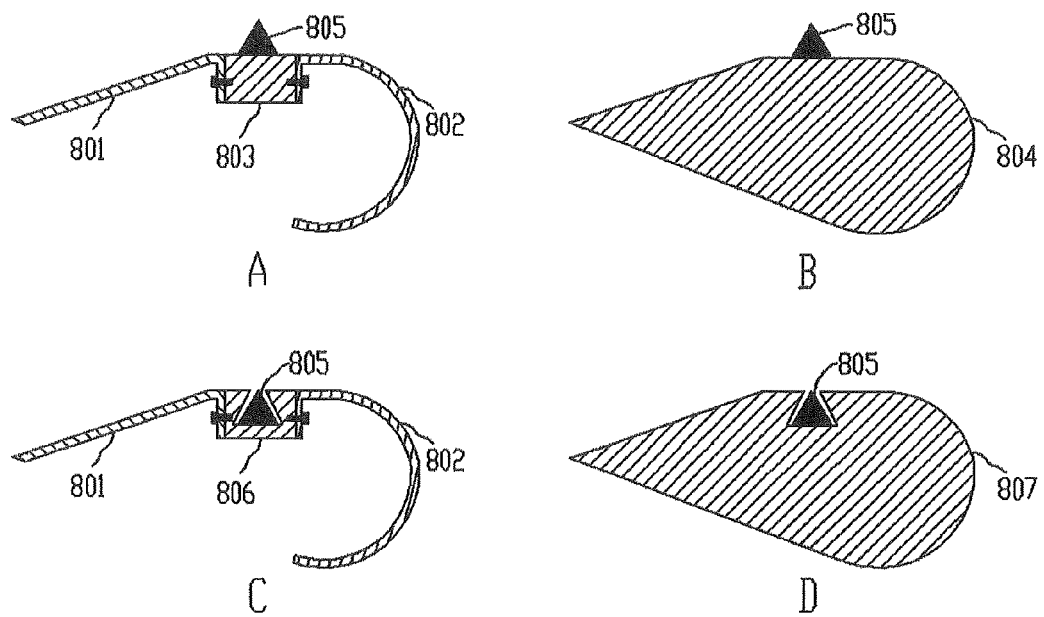
FIG. 8 shows schematic views of various implementations of flow guide devices of the electrodes in embodiments of the present disclosure.

FIG. 3 shows a schematic cross sectional view of a dual-electrode discharge cavity for an excimer laser according to an embodiment of the present disclosure. As shown in FIG. 3, a discharge cavity 301 has a symmetrical configuration (it shows bilateral symmetry in the figure and a plane of symmetry is perpendicular to a paper plane and a bottom surface of the discharge cavity). Two pairs of electrodes 302 and 303 are installed in the discharge 301. The electrodes 302 and 303 have an axial direction which is parallel to the bottom surface of the discharge cavity and is consistent with an optical axis of the light emitted from the laser. Each pair of electrodes one cathode and one anode. In general, the cathode is installed on upper side and the anode is installed on lower side. In the embodiment shown in FIG. 3, the cathodes of the two pairs of electrodes 302 and 303 are installed on insulating devices 304 and 305, so the cathodes are insulated from a cavity body of the discharge cavity. A means for installing the anode is shown in FIG. 8, in which an installing support is made of metal and is connected to the cavity body. Thus, the anode and the cavity body of the discharge cavity are at equal potential.

In order to drive a gas 306 within the cavity to be cycled, two rotors 307 and 308 for passing flows are installed at both sides of the cavity. The two rotors correspond to one pair of the two pairs of electrodes, respectively, and are beneath the electrodes. In consideration of the integrated design of the discharge cavity and the requirement of flow speed by a discharge repetition rate, a diameter of the rotor is set to range within 90-140 mm.

Figure 4:
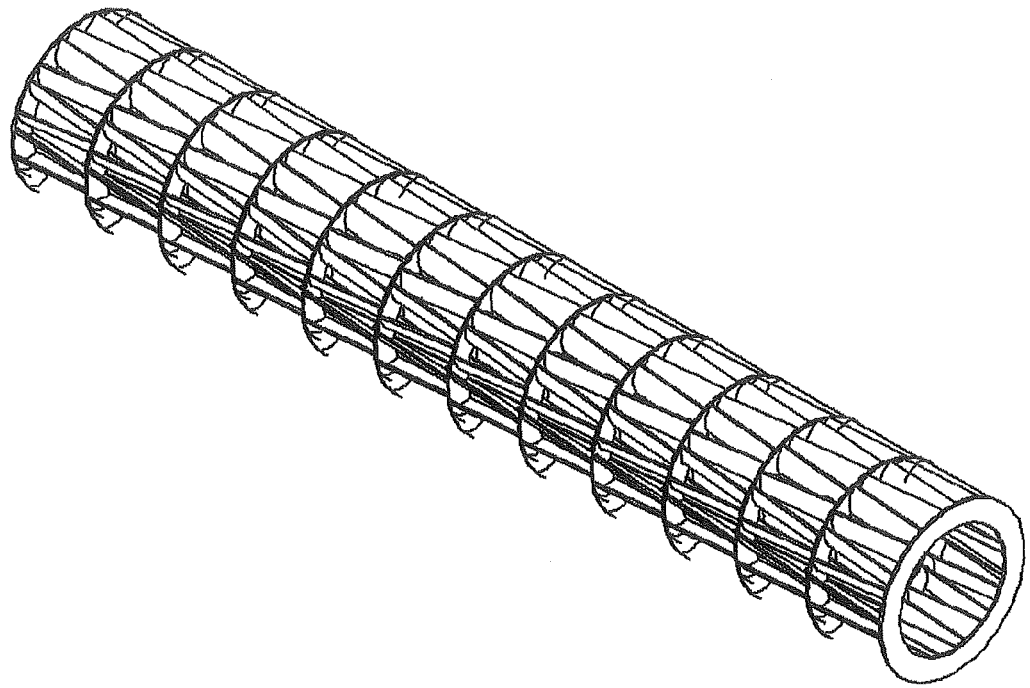
FIG. 4 shows a schematic view of one type of rotor for passing flow utilized by the embodiment of the present disclosure.

The rotor for passing flow utilized by the present disclosure is a rotor specific for the excimer laser. In general, such a rotor has better rigidity and less noise than a conventional rotor for passing flow. FIG. 4 shows a rotor specific for the excimer laser, the vanes of which are not uniformly arranged so as to decrease noise and vibration generated during operations of the rotor. In order to save cost for manufacturing, a regular rotor with straight teeth or skewed teeth may be used in the discharge cavity of the present disclosure.

Rotations axes of the two rotors 307 and 308 are parallel to the electrodes 302 and 303 and their installed positions are symmetrical about a symmetrical plane of the discharge cavity 301. As can been seen from a cross section of the cavity perpendicular to the optical axis, their positions are both at bottom of the discharge cavity by left-and-right sidewalls.

The two rotors 307 and 308 are rotated in opposite directions. As can been seen from a cross section of the cavity perpendicular to the optical axis, one rotor 307 is rotated in a clockwise direction and the other rotor 308 is rotated in an anticlockwise direction. The rotation speeds of the two rotors are kept to be consistent with each other.

If it is desirable to increase a flow rate at an exit of the rotor, it needs to force most of the gas flow to pass through grids between the respective vanes of the rotors as much as possible and it also needs to avoid passage aside the rotor. Thus, the rotation of the rotor leads to that the vanes apply work to the gases as much as possible so as to accelerate flowing of the gas.

Consequently, lower spoiler plates 309 and 310 are installed beneath each of the rotors and the functions of the lower spoiler plates are to prevent the gas flow from passing beneath the rotors. Theoretically, the smaller the gaps between the lower spoiler plate and a circumference of the rotor are, the less the gas which passes beneath the rotor is, so it is more advantageous to enhance efficiency of the rotors. However, an extremely small gas increases noise and vibration of the rotor, so the gas is generally designed to be 1-10 mm.

Figure 5:
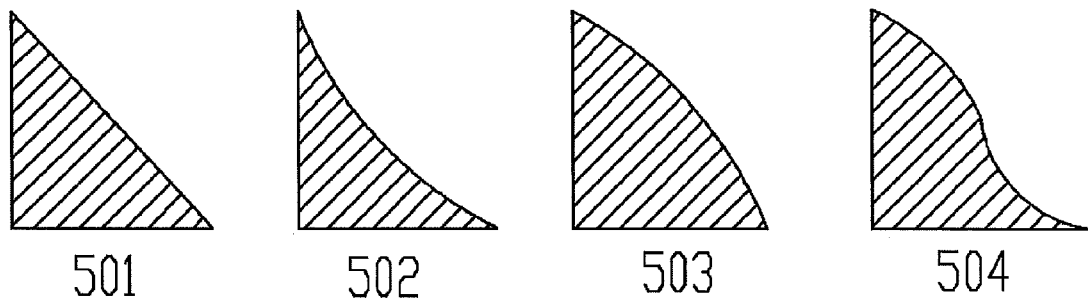
FIG. 5 shows schematic views of various implementations of the lower spoiler plate beneath the rotor in embodiments of the present disclosure.

FIG. 3 shows the most simple spoiler plates 309 and 310, which is a folded and bended component with a right angle and its erected side is configured to block the gas flow which passes through beneath the rotor. Such a form of spoiler plate may effectively block the gas flow which passes through beneath the rotor, but forms large whirl region and losses energy of gas. Thus, the present disclosure preferably manufactures the spoiler plate as a structure shown in FIG. 5. In FIG. 5, the reference sign 510 shows a declined surface and the reference signs 502-504 show cambered surfaces. Right angle sides at lower portion of the spoiler plates are installed on the bottom surface of the discharge cavity. Those forms of spoiler arrangements not only block the gas flow which passes through beneath the rotor, their declined surfaces or cambered surfaces but also may effective decrease an entrance whirl region therein, so that the gas flow is guided to the rotor to be accelerated so as to reduce the energy loss of the gas.

Figure 6:
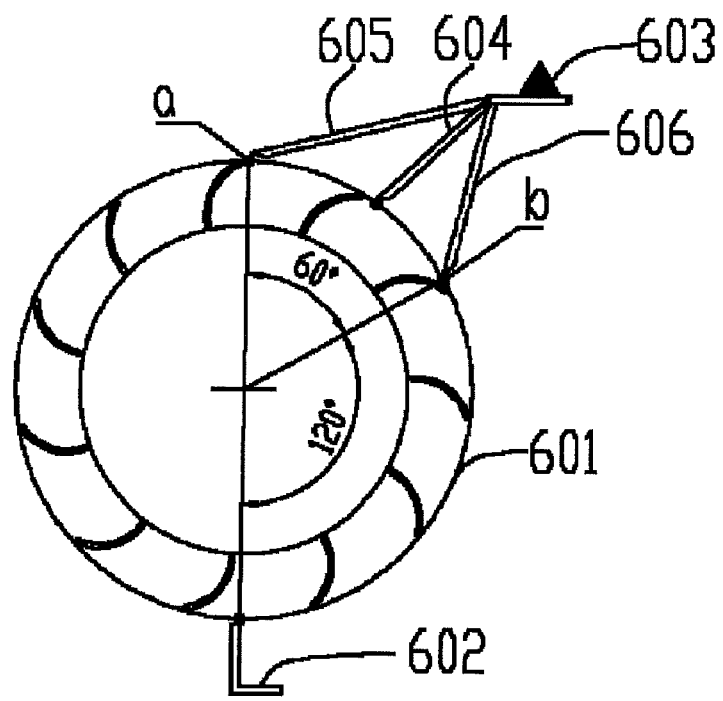
FIG. 6 shows a schematic view of the angle range for the upper spoiler plate above the rotors in embodiments of the present disclosure.

In order prevent a gas flow from passing through over the rotor, further spoiler plates 313 and 314 extend over the rotor from the installed position beneath each pair of the two pairs of electrodes (in this embodiment, the anode position) to the corresponding rotor, which are referred as the upper spoiler plates. The gaps between one ends of the upper spoiler plate 313, 314 and the circumference of the rotors 307, 308 are kept to be as small as possible. In general, it ranges to be 1-4 mm. FIG. 6 shows a schematic view of the angle range for the upper spoiler plate above the rotors in embodiments of the present disclosure. As shown in FIG. 6, a reference sign 603 refers to an anode of the discharge electrode, and the rotor 601 is located between a lower spoiler plate 602 and an upper spoiler plate 604. An upper spoiler plate and a lower spoiler plate of the same rotor point to two points on external circumference of a fan, and a central angle divided by the two points on the external circumference may be 120°-180°. Thus, positions 605 and 606 in FIG. 6 are two extreme positions for the spoiler plates over the rotors, and the points on the external circumference of the fans directed by these positions are points a and b, respectively.

In order to reduce flow resistance, the gas flow at an exit of the rotor is guided to the discharge region of the electrodes. As shown in FIG. 3, flow guide plates 311, 312 are installed on sidewalls near the rotors. The flow guide plate may be designed to be a bended surface arrangement, and may be formed by jointing a plurality of flat plates together. A transversal curve of the flow guide plates 311, 312 with a cambered surface is an involute originating from one end of the spoiler plate beneath the vanes. The end of the involute points to the upper one of the discharge electrodes 302 and 303. The involute may be designed to be various forms, such as camber line, archimdes spiral, log spiral or combination of thereof. The transversal curve of flow guide plates 311, 312 with a cambered surface as shown in FIG. 3 is a combination of a plurality of camber lines.

Figure 7:
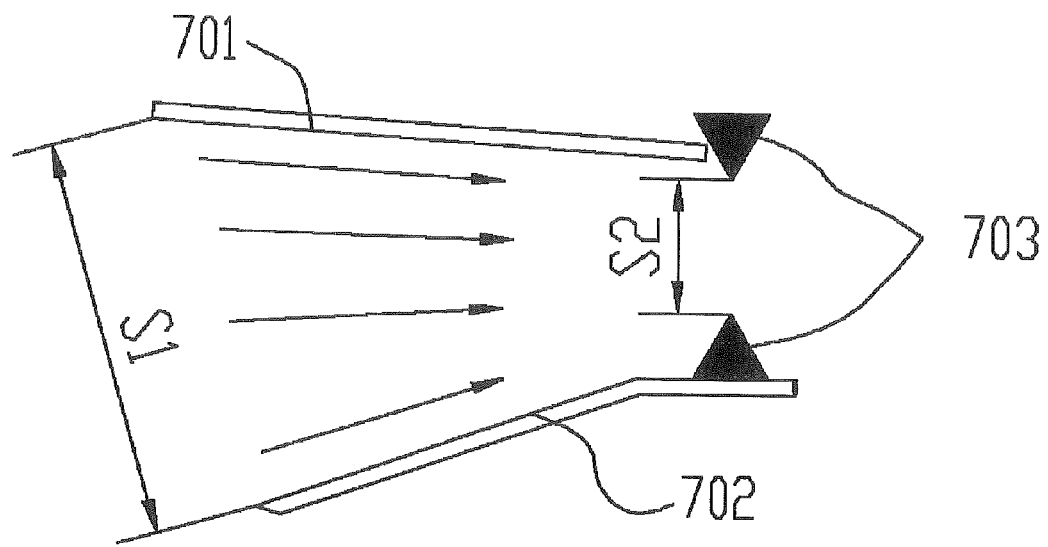
FIG. 7 shows a schematic view of a gradually tapered interval channel at an upstream of the electrodes in embodiments of the present disclosure.

As shown in FIG. 3, upper flow guide plates 315 and 316 are installed between an end of the involute flow guide plate and an upside of the discharge electrodes 302 and 303 (the upper electrodes). The upper flow guide plate and the upper spoiler plates 313, 314 constitute a gradually tapered interval channel to the discharge region, respectively. According to a fluid continuing equation, the gradually tapered interval channel plays a role of acceleration so as to obtain a gas flow at a high speed. As shown in FIG. 7, the gradually tapered interval channel constituted of the flow guide plates 701 and 702 guide the gas flow towards regions between the electrodes 703. The width of the interval channel at the entrance, S1, is larger than that of the interval channel at the exit, S2. Thus, the flow rate at the exit is higher than the flow rate at the entrance.

After the gas flow at both sides passes through the discharge region, they encounter each other near the symmetrical plane of the discharge cavity, and converge to be a rush of gas. In order to avoid loss of the impacted gas flows at both sides, a symmetrical confluent flow guide plate is installed at a middle position within the discharge region of the two electrodes, as shown by the reference sign of 317 in FIG. 3 and referred as the confluent flow guide plate. The confluent flow guide plate 317 changes directions of the gas flows which originally move in opposite directions and the two rushes of gas flows changes to move downwards so that the two rushes of gas flows converge to be one rush of downwards gas flow.

The downwards gas flows are newly divided into two ruses of gas flow by two blower fans, are accelerated by the two blower fans and start a next cycle. In order to reduce resistance generated by collision of the gas flow at the bottom surface of the cavity, a symmetrical flow guide plate is provided at a middle position on bottom of the discharge cavity, which is referred as a shunt flow guide plate, as shown by a reference sign 320 in FIG. 3, so as to facilitate distribution of the gas flow and to guide to the vanes.

At downstream of the electrodes, the gas flow will generate a trapped vortex at dead end of an installation surface of the electrodes without any protecting measurements, which increases flow resistance. In order to reduce the flow resistance caused by such an effect, the present disclosure proposes a lower flow guide plate with a shape shown by reference signs 318 and 319 in FIG. 3. As shown in the figures, the lower flow guide plates 318 and 319 are protruded from a downwards direction of the electrodes to the corresponding rotors, which presents an arc shape bending towards to the rotors. For a flow at a lower speed, such an arrangement may delay falling off of a gas attaching layer so as to reduce the flow resistance.

For simplify, in FIG. 3, the upper spoiler plate 313 and the lower spoiler plate 318 are integrated and are two portions of one feature. In an actual design, as shown in FIG. 8A and according to a further embodiment of the present disclosure, the upper and lower spoiler plates may be designed to be two individual features 801 and 802 which are installed at two front-back sides of an installation support 803 beneath the electrodes by screws. According to other embodiments of the present disclosure, such an arrangement may be manufactured not to be a sizing sheet configuration, but to be an integrated stuffed configuration. As shown in FIG. 8B, such an arrangement is only constituted of a electrode base 804 with a function of guiding flow and an electrode 805.

In order to reduce a flow resistance generated by the electrode itself, a sunk electrode base may be designed, as shown by a reference sign 806 in FIG. 8C and a reference sign of 807 in FIG. 8D. After the electrodes are installed in a sink manner, the electrodes themselves are not positioned in a primary interval channel so as to reduce the resistance of the interval channel. It should be noted that when the electrodes are installed in a sink manner, an insulating measurements have to be utilized to avoid an undesired discharge.

Figure 9:
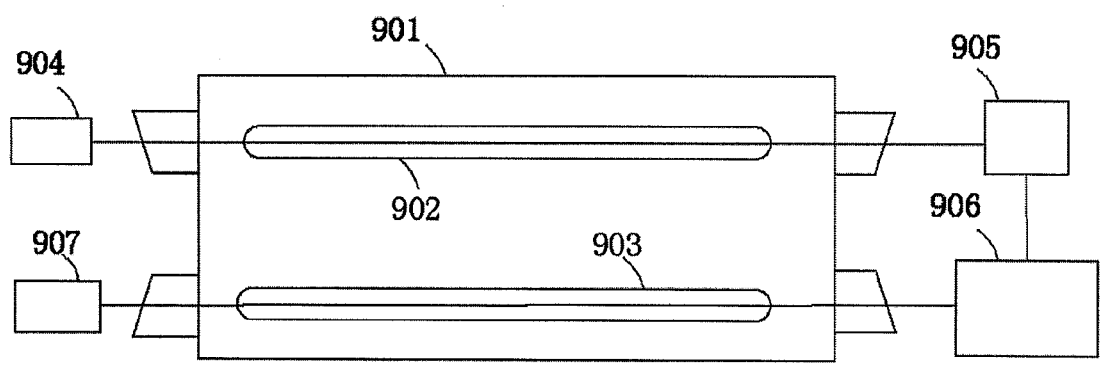
FIG. 9 shows a structural schematic view of an excimer laser based on a dual-electrode discharge cavity according to embodiment of the present disclosure.

FIG. 9 shows a structural schematic view of an excimer laser based on a dual-electrode discharge cavity as mentioned above in top view. The laser comprises a dual-electrode discharge cavity 901 in which two pairs of electrodes 902 and 903 are installed in parallel. The electrode 902 is configured to generate a seed light and the electrode 908 is configured to amplify the seed light. At a reflecting end of the electrode 901, there is a module 904 for narrowing line width. The modules 905, 906 and 907 are configured for control, adjustment and measurement of light path.

Objects, solutions and advantages of the present disclosure are described above with reference to the specific embodiments as mentioned above. However, it should be understood that the specific embodiments are provided for purpose of illustration, rather than limiting the present disclosure. Various changes, replacements, and modifications may be made without deviating from the disclosure, and shall fall in the scope of the present disclosure.

We claim:

1. A flow guide device for a discharge cavity having a symmetrical configuration and including two pairs of electrodes, comprising:
    two rotors which correspond to one pair of the two pairs of electrodes, respectively; installed positions of the rotors are symmetrical about a symmetrical plane of the discharge cavity and are beneath the electrodes; a rotational axis of the rotors is parallel to an axial direction of the electrodes which is parallel to a base plane of the discharge cavity,
    wherein the two rotors have opposite rotation directions and identical rotation speeds,
    wherein a lower spoiler plate is installed beneath each of the rotors and is configured to prevent the gas flow from passing beneath the rotors,
    wherein an upper spoiler plate extends from the installed position beneath each pair of the electrodes to a corresponding rotor, and
    wherein an upper flow guide plate is installed between an end of the flow guide plate and the electrodes, and the upper flow guide plate and the upper spoiler plate constitute a gradually tapered interval channel.

2. The flow guide device according to claim 1, wherein the lower spoiler plate has a declined surface or a cambered surface, i.e. a windward side of the spoiler plate is designed to be a declined surface or a cambered surface, and the cambered surface is an inwardly recessed cambered surface, an outwardly raised cambered surface, or a combination thereof.

3. The flow guide device according to claim 1, wherein the flow guide plate is installed on sidewalls of the rotors and/or surfaces of the sidewalls are directly machined to be the surface shape of the flow guide plate, so as to guide a gas flow at an exit of the rotors to the discharge region of the electrodes.

4. A dual-electrode discharge cavity comprising the flow guide device according to claim 1.

5. An excimer laser comprising the dual-electrode discharge cavity according to claim 4.

6. A flow guide device for a discharge cavity having a symmetrical configuration and including two pairs of electrodes, comprising:
    two rotors which correspond to one pair of the two pairs of electrodes, respectively; installed positions of the rotors are symmetrical about a symmetrical plane of the discharge cavity and are beneath the electrodes; a rotational axis of the rotors is parallel to an axial direction of the electrodes which is parallel to a base plane of the discharge cavity,
    wherein the two rotors have opposite rotation directions and identical rotation speeds,
    wherein a lower spoiler plate is installed beneath each of the rotors and is configured to prevent the gas flow from passing beneath the rotors,
    wherein an upper spoiler plate extends from the installed position beneath each pair of the electrodes to a corresponding rotor, and
    wherein a symmetrical confluent flow guide plate is installed at a middle position within a discharge region of the two electrodes and is configured to converge a gas flow passing through the discharge region into a downwards gas flow.

7. A flow guide device for a discharge cavity having a symmetrical configuration and including two pairs of electrodes, comprising:
    two rotors which correspond to one pair of the two pairs of electrodes, respectively; installed positions of the rotors are symmetrical about a symmetrical plane of the discharge cavity and are beneath the electrodes; a rotational axis of the rotors is parallel to an axial direction of the electrodes which is parallel to a base plane of the discharge cavity,
    wherein the two rotors have opposite rotation directions and identical rotation speeds,
    wherein a lower spoiler plate is installed beneath each of the rotors and is configured to prevent the gas flow from passing beneath the rotors,
    wherein an upper spoiler plate extends from the installed position beneath each pair of the electrodes to a corresponding rotor, and
    wherein a lower flow guide plate is protruded from a downwards direction of each electrodes to the corresponding rotors, which presents an arc shape bending towards to the rotors.

* * * * *